Jan. 8, 1963 P. J. W. JOCHEMS ETAL 3,072,514

METHOD OF PRODUCING SEMI-CONDUCTOR ELECTRODE SYSTEMS

Filed Jan. 12, 1959 2 Sheets-Sheet 1

INVENTORS.
P.J.W. JOCHEMS
J.J.A. PLOOS VAN AMSTEL
H. RINIA.
BY Frank R. Trifari
AGENT.

METHOD OF PRODUCING SEMI-CONDUCTOR ELECTRODE SYSTEMS

Filed Jan. 12, 1959 2 Sheets-Sheet 2

INVENTORS.
P. J. W. JOCHEMS
J. J. A. PLOOS VAN AMSTEL
H. RINIA.
BY
Frank R. Jifari
AGENT.

United States Patent Office 3,072,514

Patented Jan. 8, 1963

3,072,514

METHOD OF PRODUCING SEMI-CONDUCTOR ELECTRODE SYSTEMS

Pieter Johannes Wilhelmus Jochems, Johannes Jacobus Asuerus Ploos van Amstel, and Herre Rinia, all of Emmasingel, Eindhoven, Netherlands, assignors to North American Philips Company, Inc., New York, N.Y., a corporation of Delaware Filed Jan. 12, 1959, Ser. No. 786,421
Claims priority, application Netherlands Jan. 17, 1958
10 Claims. (Cl. 156—8)

This invention relates to a method of producing a semi-conductor electrode system or device, such as a transistor or a crystal diode.

In the process of manufacturing such systems the problem sometimes arises of removing parts of such a system at accurately predetermined areas. For this purpose in a known method an abrasive, such as sand, is blasted onto the system, a mask ensuring that only the parts to be removed are struck by the abrasive while the other parts are protected against it. Instead of abrasives use can also be made of a beam of electrically charged particles which are focussed and accelerated under the action of a field. It has also been proposed to cover the electrode system with a photo-sensitive layer, and to project onto this layer a light-beam which is partly screened by a mask, so that the photo-sensitive layer is locally made indissoluble, the other dissoluble parts of the layer being removed subsequently. By then dipping the system in an etching liquid and causing the indissoluble parts of the layer to act as a mask, certain parts of the system could also be removed.

In these methods the problem continually arises of providing a mask on an accurately predetermined area of an electrode system. However, as the size of the electrode systems is reduced, the requirements to be satisfied with respect to accuracy become more stringent. Another disadvantage can consist in that it is difficult to apply such a mask to a surface which is not flat, for example, owing to the fact that electrodes or contacts are provided on said surface.

The present invention relates particularly to a method of producing a semi-conductor electrode system, in which parts of the system are removed by the action of means which is projected onto these parts, other parts being protected against the action of this means. The term "means" is to be taken in a broad sense: it may mean an abrasive, a solvent, an electron beam or a light beam.

It is an object of the present invention to effect the screening or masking accurately and simply and to avoid the laborious positioning of a mask. The invention is based on the recognition of the fact that in many cases the masking action of at least one of the electrodes themselves can be used in combination with a special direction in which the means is projected.

According to the invention, the system or assembly comprises in a manner known per se a semi-conductor body having at least one electrode protruding from the surface of this body, while the means is projected onto the electrode and the part of the surface surrounding the electrode at an angle to the normal to the surface of the body adjoining the electrode such that some parts of the system which adjoin the electrode are removed and other parts are left intact.

It should be noted that the words "parts of the system" are not to be understood to mean parts of the semi-conductor body only but, as the case may be, also parts, such as masking layers, provided on this body during the treatment.

As has been mentioned hereinbefore, the invention provides a solution which is particularly suitable for use with electrode systems of very small size. Since small systems generally have insufficient mechanical strength to be exposed to the action of an abrasive, according to a preferred embodiment of the invention, such an electrode and the adjoining surface of the semi-conductor are first covered with a masking layer, some parts of which are then removed by use of the means.

With respect to this masking layer there is a far greater freedom of choice so that this layer can consist of a readily removable substance. This latter removal may be effected by means of an abrasive; however, preferably use is made of means in which a masking layer can be dissolved. This solvent means can be projected onto the electrode system as a fine mist by means of a jet of gas or air. Thus the forces exerted on the electrode system are very small.

The invention is particularly suitable for use in manufacturing electrode systems comprising a semi-conductor body having two adjacent electrodes which protrude from the surface of the body, while the parts of the surface of the body which surround these electrodes must be removed with the exception of the parts between said electrodes. In this embodiment the means is projected at least twice in directions lying in the plane which passes through these electrodes and extends at right angles to the semi-conductor surface, the directions being substantially opposed so that substantially those parts of the electrode surfaces are struck by the means which are outwardly disposed to one another, whereas the facing parts of these surfaces and the system parts between the electrodes are masked and not removed. The masking action of an electrode can be enhanced by providing such an electrode with a current supply lead before the means is projected onto it.

In order that the invention may readily be carried out, an embodiment will now be described by way of example with reference to the accompanying drawings, in which.

Figure 1:
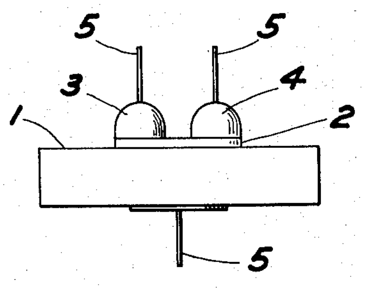
FIG. 1 is a side elevation of a transistor.

The embodiment of the method to be described relates to the manufacture of a transistor of the kind shown in FIG. 1. It comprises a semi-conductor body 1 consisting of p-type germanium on which a thin layer 2 of n-type germanium is arranged. To this layer 2 electrodes 3 and 4 are alloyed, the electrode 3 making a rectifying contact and the electrode 4 an ohmic contact with the layer 2. To parts 1, 3 and 4 conductors 5 are connected. The body 1 is the collector, the electrode 3 the emitter and the electrode 4 the base of this transistor.

Figure 2:
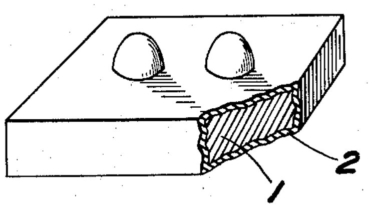
FIGS. 2 to 6 are diagrammatic perspective views of various stages of the manufacture of this transistor.

The starting material for manufacturing this transistor can be a slice of p-type germanium having a specific resistivity of 2 ohm-cm. This slice is subjected in a furnace at a temperature of about 800° C. to the action of arsenic vapour, so that the outer surface to a depth of 20 microns changes into an n-type conductivity layer 2 (FIG. 2).

Now the electrodes 3 and 4 are alloyed to the body at 500° C. The electrode 3 may be a pellet of indium while the electrode 4 consists of an indium pellet containing 5% of antimony.

Figure 3:
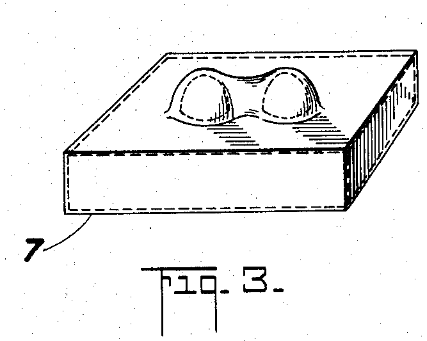

The assembly is then dipped in soluble lacquer to produce a masking layer 7 (FIG. 3). This lacquer may consist of a solution of 5 gms. of nitro-cellulose in 70 gms. of butyl acetate.

Now by means of a spray-gun a mixture of air and butyl acetate, a solvent for the lacquer, is sprayed on the electrode system successively from two opposite directions.

Figure 4:
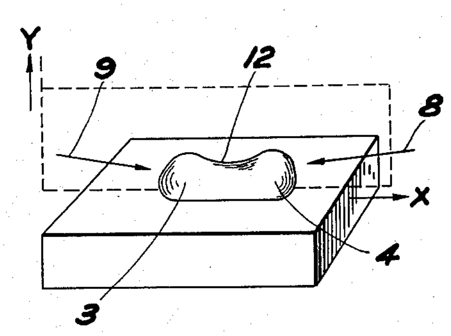

These directions are indicated in FIG. 4 by arrows 8 and 9. They lie in the plane X—Y which passes through the two electrodes 3 and 4 and extends at right angles to the upper surface of the semiconductor body. Both directions are at an angle of nearly 90° to the normal to the area in question. Hence the lacquer layer 7 is removed from the entire upper surface of the semiconductor body with the exception of a part 12 which lies between the electrodes 3 and 4.

Thus, in this spraying operation, the protruding electrodes 3 and 4 in combination with the directions of spraying produce a mask 12 consisting of nitrocellulose.

Figure 5:
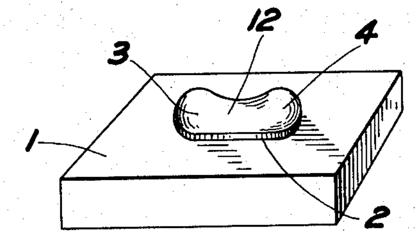
Figure 6:
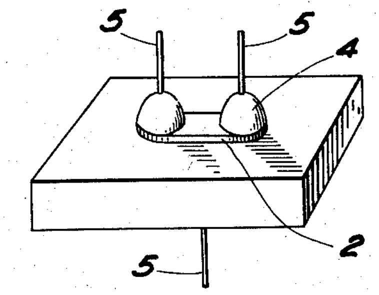

Now the electrode system is dipped in an etching liquid which may consist of a mixture of 5 parts of 30% hydrofluoric acid, 5 parts of nitric acid and 10 parts of water, for a time such that the n-type layer 2 is completely dissolved with the exception of the parts covered by the electrodes 3 and 4 and the mask 12 (FIG. 5). Subsequently the mask 12 is dissolved in butyl acetate after which conductors 5 are soldered to the parts 1, 3 and 4 (FIG. 6) and the assembly subjected to the usual final etching process.

Figure 7:
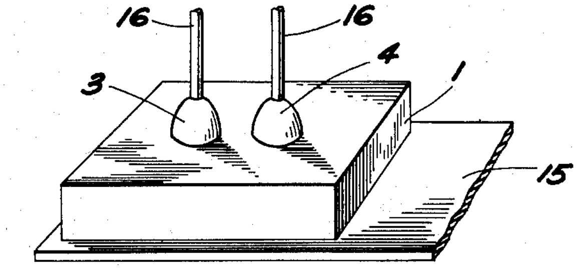
FIGS. 7 and 8 show a modification of FIGS. 2 and 3.
Figure 8:
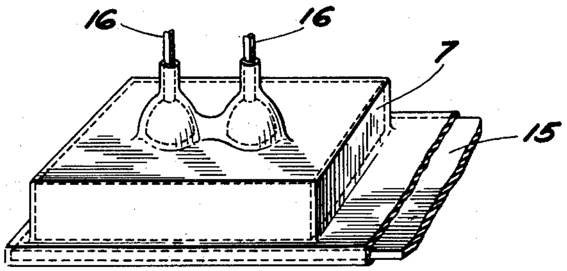

In a modification of this process, a conductor is provided prior to the diffusion process (FIG. 7). The semiconductor body is first soldered to a nickel strip 15. Subsequently the diffusion process in which the layer 2 is formed is effected, after which the electrodes 3 and 4 are provided by alloying and current supply wires 16 are secured to the electrodes. If, now, the lacquer layer 7 is applied, owing to the adhesion and the slight relative spacing of the current supply wires 16 the lacquer aggregates slightly between these conductors and the electrodes (FIG. 8). In the subsequent solvent-spraying operation the conductors 16 increase the shadow action of the electrodes 3 and 4, so that the final mask 12 is slightly stronger than in the preceding case shown in FIG. 5.

Figure 9:
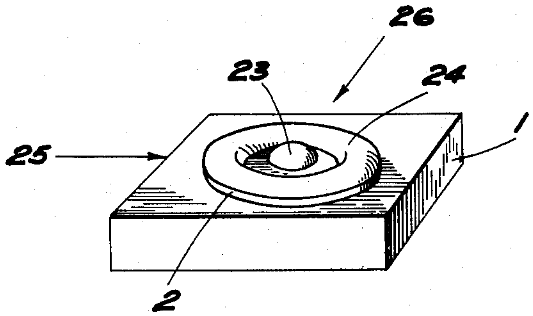
FIG. 9 is a perspective view of a transistor provided with an annular electrode.

FIG. 9 shows another transistor which can be simply manufactured by the method described hereinbefore. This transistor again comprises a semi-conductor crystal 1 of p-type, on which a thin layer 2 of n-type is provided. On this layer there are arranged a central electrode 23, which forms a rectifying contact with the layer 2, and an annular electrode 24, which forms an ohmic contact. In order to remove the entire layer 2 with the exception of the part covered and encircled by the electrode 24, the assembly was again covered with a lacquer layer. Subsequently a solvent for this lacquer was projected in a number of different directions parallel to the upper surface of the crystal 1, for example according to arrows 25 and 26 so that the lacquer was entirely removed except for the portion within the annular electrode 24. After the uncovered parts of the layer 2 had been removed by etching, the lacquer layer within the electrode 24 was also dissolved. Then conductors (not shown) were provided and the assembly subjected to a final etching treatment.

Although in all the examples described use was made of a lacquer layer and a sprayed solvent, it will be appreciated that other means can be employed by which, using the screening effect of protruding electrodes, certain surface parts adjoining these electrodes can be removed while other parts are left intact.

What is claimed is:

1. In the manufacture of a semiconductor device comprising providing a semiconductor body having an electrode portion protruding from the surface of the semiconductor body, the method of selectively removing surface portions of the body leaving intact a surface portion adjacent the electrode, comprising the steps of covering the said surface and electrode with a masking layer, providing means capable of removing the masking layer when contacting same, projecting the said removal means at the surface along a direction and at such a low angle to the surface that the protruding electrode portion shadows the adjacent portion of the masking layer, coextensive with the surface portion to remain intact, and protects it from contact with the removal means while the remaining unshadowed and unprotected masking layer portions are contacted and removed exposing surface portions of the body, and thereafter subjecting the said body with the masked surface portion to a treatment capable of removing exposed body portions to remove said exposed portions of the body resulting in a raised body portion on which is located the electrode.

2. In the manufacture of a semiconductor device comprising providing a semiconductor body having an electrode portion protruding from the surface of the semiconductor body, the method of selectively removing surface portions of the body leaving intact a surface portion adjacent the electrode, comprising the steps of covering the said surface and electrode with a dissoluble but etch-resistant masking layer, providing a solvent for the masking layer, projecting the said solvent at the surface along a direction and at such a low angle to the surface that the protruding electrode portion shadows the adjacent portion of the masking layer, coextensive with the surface portion to remain intact, and protects it from contact with the solvent while the remaining unshadowed and unprotected masking layer portions are dissolved and removed exposing surface portions of the body, and thereafter subjecting the said body with the masked surface portion to an etching treatment to remove exposed portions of the body resulting in a raised body portion on which is located the electrode.

3. The method of claim 2 wherein the solvent is sprayed as a fine mist at the surface.

4. In the manufacture of a semiconductor device comprising providing an assembly including a semiconductor body having two spaced, adjacent electrode portions protruding from the same surface of the semiconductor body, the method of selectively removing surface portions of the assembly leaving intact the surface portions intervening between the electrodes, comprising the steps of providing means capable of removing surface portions of the assembly when projected thereon, projecting the said removal means at the assembly surface along a first direction and at such a low angle to the surface that the closest protruding electrode portion shadows the intervening surface portions and protects them from contact with the removal means while the remaining unshadowed and unprotected surface portions are removed, and projecting the said removal means at the assembly surface along a second direction different from the first direction and at such a low angle to the surface that the closest protruding electrode portion continues to shadow the intervening surface portions and to protect them from contact with the removal means while undesired surface portions shadowed during projection along the first direction are no longer shadowed and protected from the projection of the removal means along the second direction and are now removed.

5. The method of claim 4 wherein conductive leads are connected to the electrode portions prior to projection of the removal means to increase the shadow effect.

6. In the manufacture of a semiconductor device comprising providing an assembly including a semiconductor body having two spaced, adjacent electrode portions protruding from the same surface of the semiconductor body, the method of selectively removing surface portions of the assembly leaving intact the surface portions intervening between the electrodes, comprising the steps of providing means capable of removing surface portions when projected thereon of the assembly, projecting the said removal means at the assembly surface along a first direction generally along a line connecting the two electrode portions and at such a low angle to the surface that the closest protruding electrode portion shadows the intervening surface portions and protects them from contact with the removal means while the remaining unshadowed and unprotected surface portions are removed, and thereafter projecting the said removal means at the assembly surface along a second direction substantially opposite to the first direction and at such a low angle to the surface that the other protruding electrode portion continues to shadow the intervening surface portions and to protect them from contact with the removal means while undesired but previously shadowed surface portions are no longer shadowed and protected from the projection of the removal means along the second direction and are now removed.

7. The method of claim 6 wherein the surface of the semiconductor body is first covered with a masking layer, and the removal means employed is capable of removing the masking layer wherever contacted.

8. In the manufacture of a semiconductor device comprising providing a semiconductor body having two spaced, adjacent electrode portions protruding from the same surface of the semiconductor body, and providing on the said surface a dissoluble but etch-resistant masking layer covering the surface and the electrode portions, the method of selectively removing layer portions located outwardly of the electrode portions leaving intact the layer portions intervening between the electrodes, comprising the steps of providing a solvent for the dissoluble masking layer, projecting the said solvent at the covered surface along a first direction and at such a low angle to the surface that the closest protruding electrode portion shadows the intervening layer portions and protects them from contact with the solvent while the remaining unshadowed and unprotected layer portions are dissolved and removed, and thereafter projecting the said solvent at the said surface along a second direction different from the first direction and at such a low angle to the surface that the closest protruding electrode portion continues to shadow the intervening layer portions and to protect them from contact with the solvent while undesired but previously shadowed layer portions are no longer shadowed and protected from the projection of the solvent along the second direction and are now dissolved and removed.

9. The method of claim 8 wherein the solvent is sprayed onto the surface, the first direction extends generally along a line connecting the two electrode portions, and the second direction is substantially opposite to the first direction.

10. The method of claim 8 wherein the body with the masked intervening portions is subjected to an etching treatment to remove unmasked portions of the semiconductor body to produce a raised body portion underlying the electrodes.

References Cited in the file of this patent

UNITED STATES PATENTS

| | | |
|---|---|---|
| 2,261,988 | Gaebel | Nov. 11, 1941 |
| 2,705,765 | Geer | Apr. 5, 1955 |
| 2,799,637 | Williams | July 16, 1957 |
| 2,813,782 | Spanos | Nov. 19, 1957 |
| 2,910,634 | Rutz | Oct. 27, 1959 |
| 2,926,076 | Guenst | Feb. 23, 1960 |
| 3,012,921 | Vaughan | Dec. 12, 1961 |